US010009322B2

(12) United States Patent
Agrawal et al.

(10) Patent No.: US 10,009,322 B2
(45) Date of Patent: *Jun. 26, 2018

(54) SECURE VIRTUALIZED MOBILE CELLULAR DEVICE

(71) Applicant: International Business Machines Corporation, Armonk, NY (US)

(72) Inventors: Dakshi Agrawal, Monsey, NY (US); Bruce O. Anthony, Jr., Pine Island, MN (US); Chatschik Bisdikian, Chappaqua, NY (US); Mudhakar Srivatsa, White Plains, NY (US); Dinesh Verma, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/086,683

(22) Filed: Mar. 31, 2016

(65) Prior Publication Data

US 2016/0212106 A1 Jul. 21, 2016

Related U.S. Application Data

(63) Continuation of application No. 14/058,649, filed on Oct. 21, 2013, now Pat. No. 9,342,331.

(51) Int. Cl.
*H04L 29/06* (2006.01)
*H04W 12/02* (2009.01)
(Continued)

(52) U.S. Cl.
CPC ...... *H04L 63/0428* (2013.01); *G06F 9/45558* (2013.01); *G06F 21/53* (2013.01);
(Continued)

(58) Field of Classification Search
CPC . H04L 63/0428; H04L 63/0272; G06F 9/455; G06F 9/45558; H04W 88/12
(Continued)

(56) References Cited

U.S. PATENT DOCUMENTS 5,873,033 A * 2/1999 Hjern ................ H04M 3/42246
455/417
7,185,363 B1 * 2/2007 Narin ..................... G06F 21/10
726/18
(Continued)

OTHER PUBLICATIONS

Office Action dated Mar. 2, 2018 in related DE Application No. 10 2014 114 010.9 reference U.S. 2014/0173692 previously cited in IDS on Jun. 14, 2016).

*Primary Examiner* — Ali Shayanfar
*Assistant Examiner* — Shahriar Zarrineh
(74) *Attorney, Agent, or Firm* — Patent Portfolio Builders PLLC

(57) ABSTRACT

Secure virtualizing of a mobile cellular device uses a cellular communication network having base transceiver station edge node servers. A virtualized-instance host server contains a virtualized instance of an enterprise environment. Base station controllers are in communication with and control the base transceiver stations. A mobile switching center in communication with the base station controllers contains the virtualized-instance host server. A cellular communication device is in communication with an edge node server, and an auxiliary data display entry device is in communication with the cellular communication device such that the virtualized instance of the enterprise environment is on the edge node server. Communications between the auxiliary display and data entry device are encrypted. In addition, movement of the cellular communication device within the cellular communication network are anticipated so that additional remote virtualized instances of the enter-
(Continued)

prise environment are provided on candidate future edge servers.

20 Claims, 2 Drawing Sheets

(51) Int. Cl.
G06F 9/455 (2018.01)
G06F 21/53 (2013.01)
G06F 21/84 (2013.01)
H04W 88/12 (2009.01)

(52) U.S. Cl.
CPC ............ *G06F 21/84* (2013.01); *H04W 12/02* (2013.01); *G06F 9/455* (2013.01); *H04L 63/0272* (2013.01); *H04W 88/12* (2013.01)

(58) Field of Classification Search
USPC ........................................................ 380/247
See application file for complete search history.

(56) References Cited

U.S. PATENT DOCUMENTS

| | | | |
|---|---|---|---|
| 7,734,380 B2 | 6/2010 | Ransom et al. | |
| 8,244,211 B2 | 8/2012 | Clark | |
| 8,613,070 B1* | 12/2013 | Borzycki | G06F 21/6218 726/8 |
| 8,621,199 B2* | 12/2013 | Andress | H04L 63/0281 713/153 |
| 8,800,007 B1* | 8/2014 | Rajagopalan | H04L 63/0272 380/27 |
| 8,850,010 B1* | 9/2014 | Qureshi | H04L 41/0816 709/225 |
| 8,943,506 B2* | 1/2015 | Tang | G06F 9/45558 718/1 |
| 8,949,929 B2* | 2/2015 | Kelly | G06F 21/53 455/410 |
| 9,529,996 B2* | 12/2016 | Qureshi | G06F 21/53 |
| 9,804,866 B2* | 10/2017 | Halls | G06F 9/45533 |
| 2003/0087629 A1* | 5/2003 | Juitt | H04L 1/22 455/411 |
| 2004/0142682 A1* | 7/2004 | Kamiya | H04L 63/168 455/418 |
| 2004/0236634 A1* | 11/2004 | Ruuttu | G06Q 30/02 705/26.5 |
| 2005/0080915 A1* | 4/2005 | Shoemaker | H04L 29/06027 709/231 |
| 2005/0130654 A1* | 6/2005 | Di Claudio | H04W 8/06 455/433 |
| 2005/0220080 A1 | 10/2005 | Ronkainen et al. | |
| 2006/0224712 A1* | 10/2006 | Aho | H04L 41/0803 709/223 |
| 2006/0229090 A1* | 10/2006 | LaDue | H04L 27/0004 455/507 |
| 2007/0091848 A1* | 4/2007 | Karia | H04L 29/06027 370/331 |
| 2007/0174520 A1 | 7/2007 | Moon | |
| 2007/0276897 A1 | 11/2007 | Tameshige et al. | |
| 2008/0162637 A1 | 7/2008 | Adamczyk et al. | |
| 2008/0263363 A1 | 10/2008 | Jeuneman et al. | |
| 2009/0034729 A1* | 2/2009 | Brown | H04L 63/123 380/270 |
| 2009/0036111 A1* | 2/2009 | Danford | H04L 41/0893 455/419 |
| 2009/0061873 A1 | 3/2009 | Bao et al. | |
| 2009/0165148 A1 | 6/2009 | Frey et al. | |
| 2009/0181671 A1* | 7/2009 | Preiss | H04L 63/0428 455/435.1 |
| 2010/0023750 A1 | 1/2010 | Tan | |
| 2010/0058479 A1 | 3/2010 | Chen et al. | |
| 2010/0121975 A1* | 5/2010 | Sinha | H04L 65/103 709/231 |
| 2010/0146504 A1 | 6/2010 | Tang | |
| 2010/0293217 A1* | 11/2010 | Srinivasan | H04L 67/2804 709/202 |
| 2010/0332617 A1* | 12/2010 | Goodwin | G06F 8/60 709/219 |
| 2011/0131423 A1 | 6/2011 | Ponsini | |
| 2011/0177825 A1* | 7/2011 | Huang | H04W 64/00 455/456.1 |
| 2011/0179429 A1 | 7/2011 | Bertin et al. | |
| 2011/0185398 A1* | 7/2011 | Kubota | G06F 21/41 726/3 |
| 2011/0210907 A1 | 9/2011 | Martin-Cocher et al. | |
| 2011/0219459 A1 | 9/2011 | Andreasson | |
| 2011/0239125 A1 | 9/2011 | Kristensen et al. | |
| 2011/0277026 A1* | 11/2011 | Agarwal | G06F 21/41 726/8 |
| 2011/0277027 A1* | 11/2011 | Hayton | H04L 63/0815 726/8 |
| 2012/0079122 A1* | 3/2012 | Brown | H04L 12/4641 709/227 |
| 2012/0281559 A1* | 11/2012 | Ner | H04W 28/06 370/252 |
| 2013/0130653 A1* | 5/2013 | Deasy | C09J 7/041 455/411 |
| 2013/0219471 A1* | 8/2013 | Brown | H04W 12/08 726/4 |
| 2013/0254264 A1* | 9/2013 | Hankinson | H04L 29/06047 709/203 |
| 2013/0298201 A1* | 11/2013 | Aravindakshan | H04L 63/0272 726/4 |
| 2013/0316677 A1* | 11/2013 | Aharon | H04W 12/02 455/411 |
| 2014/0007215 A1* | 1/2014 | Romano | H04L 63/0281 726/12 |
| 2014/0007222 A1* | 1/2014 | Qureshi | G06F 21/10 726/16 |
| 2014/0032759 A1* | 1/2014 | Barton | H04L 67/10 709/225 |
| 2014/0040638 A1 | 2/2014 | Barton et al. | |
| 2014/0059525 A1 | 2/2014 | Jawa et al. | |
| 2014/0109078 A1* | 4/2014 | Lang | G06F 8/52 717/172 |
| 2014/0143692 A1 | 5/2014 | Wigdor et al. | |
| 2014/0164944 A1* | 6/2014 | Sivakumar | G06F 17/30905 715/746 |
| 2014/0173692 A1* | 6/2014 | Srinivasan | H04W 12/02 726/4 |
| 2014/0189781 A1* | 7/2014 | Manickam | H04L 67/34 726/1 |
| 2014/0199961 A1* | 7/2014 | Mohammed | H04L 63/0428 455/406 |
| 2014/0298420 A1* | 10/2014 | Barton | H04L 63/10 726/4 |
| 2014/0310512 A1* | 10/2014 | Sau | H04L 63/029 713/151 |
| 2014/0331060 A1* | 11/2014 | Hayton | G06F 21/31 713/186 |
| 2014/0331297 A1 | 11/2014 | Innes et al. | |
| 2015/0007350 A1* | 1/2015 | Gudipati | G06F 21/54 726/30 |
| 2015/0033282 A1* | 1/2015 | O'Hern | H04L 63/20 726/1 |
| 2015/0089497 A1* | 3/2015 | Borzycki | G06F 9/45533 718/1 |
| 2015/0101018 A1* | 4/2015 | Forte | H04L 63/10 726/4 |
| 2016/0004870 A1* | 1/2016 | Forte | H04L 63/20 706/12 |
| 2017/0244724 A1* | 8/2017 | Deasy | H04L 63/108 |

* cited by examiner

SECURE VIRTUALIZED MOBILE CELLULAR DEVICE

CROSS REFERENCE TO RELATED APPLICATIONS

The present application is a continuation of, and claims the benefit of priority of, U.S. patent application Ser. No. 14/058,649, filed Oct. 21, 2013, titled "Secure Virtualized Mobile Cellular Device" the entire contents of which are incorporated herein by reference.

FIELD OF THE INVENTION

The present invention relates to cellular communication devices and networks.

BACKGROUND OF THE INVENTION

Enterprises are encouraging the use of mobile smartphones in the workplace to increase productivity. In one industry practice, employees buy their own smartphones and install enterprise software on the phones to increase productivity on the move. However, in many industry sectors, e.g., finance and defense, employees are provided with standardized smartphones due to security concerns, these standardized smartphones are "locked down" and have limited functionality. For example, the universal serial bus (USB) ports, javascript the web browser and software upgrades over popular marketplaces (iTunes, Android) are disabled on these devices. Only enterprise applications from a secure portal can be installed.

Giving a separate locked phone to each employee, however, presents a number of drawbacks. For example, users are frustrated as phones are not fully functional and cannot be used for personal usage, prompting some users to carry two phones—one for business and a second for personal use. In addition, the enterprises providing these phones incur both capital expenditures and operating expenditures from owning and supporting these phones. Other solutions to the security concerns include installing a hypervisor on each mobile phone and securely booting a business image on the mobile phone. However, this approach requires cooperation of both device manufacturers and service providers, who tightly control the phones. The virtualization if done correctly can solve most of the security issues but not when a root kit operates below the hypervisor layer.

SUMMARY OF THE INVENTION

Exemplary embodiments of systems and methods in accordance with the present invention are directed to creating a secure mobile device that removes the drawbacks of previous attempts at providing secure mobile communications and virtualized cellular devices to employees. The present invention utilizes four ingredients. The first is the use of a mobile cloud. An image of the mobile device runs in the mobile cloud, and the mobile cloud can be located, for example, in base stations, radio network controller (RNC) or a core network. The second is a display protocol similar to Citrix independent computing architecture (ICA) or Microsoft remote desktop protocol (RDP) that can be used by employees to access a virtualized image from their smartphones. The third is a scrambler and descrambler pair that encrypts and decrypts data flowing to and from the virtualized image to smartphone. The fourth is a snap-on display and touch screen that snaps on to the original screen. These ingredients are combined to allow secure access to mobile phone images running in the cloud.

DETAILED DESCRIPTION

Figure 1:
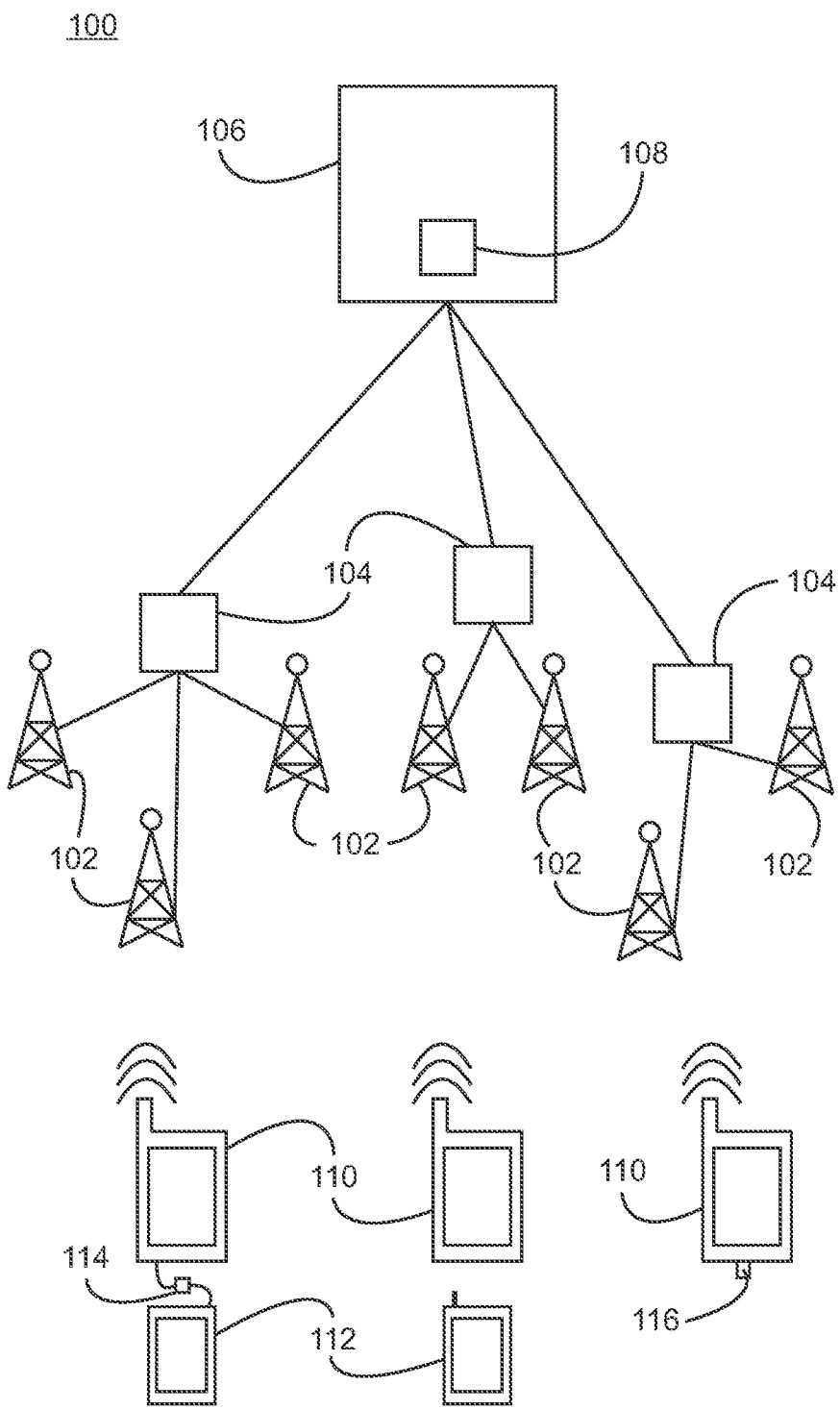
FIG. 1 is a an illustration of an embodiment of a system for secure virtualizing of a mobile cellular device in accordance with the present invention.

Exemplary embodiments in accordance with the present invention utilize servers located deep in the cellular network or in a datacenter. These servers are running mobile device images of individual users. These individual user mobile device images are accessed by each individual user through their smartphone across the cellular network using a display protocol. Suitable display protocol include, but are not limited to, Citrix ICA and RDP. Since each smartphone is only used as a display device, an android image can be run on an iPhone or vice-versa. Therefore, the present invention provides for flexibility in the type of device used. Since running protocols like RDP without any modification is insecure, each smartphone may have compromised device drivers, i.e., touch or display drivers that may steal information presented on the smartphone in order to circumvent security. To avoid compromises from display or touch drivers, the present invention uses a separate auxiliary data display and data entry devices that are in communication with the smartphone. Suitable auxiliary data display and data entry devices include, but are not limited to touch screens. The data display and data entry devices can also utilize audible inputs (speech recognition) and outputs and tactile inputs and outputs. The auxiliary data display and data entry devices are in communication with the smartphones and provide a scrambled video signal to the display drivers in the smartphones. These video signals are scrambled by the server. The auxiliary data display and data entry devices can be connected to the smartphones using a wired connection, e.g., a tether, or a wireless connection, e.g., blue tooth.

In accordance with one exemplary embodiment, the auxiliary data display and data entry device is provided in an enclosing case for mobile device or smartphone. This combination of data display and data entry includes multiple connectors that are used to feed a video signal to the data display screen and to obtain touch output. In one embodiment, this multiple connectors include three connectors, one for video to the display screen, one for a serial port for getting data to and from a touch screen and one for power. In one embodiment, the auxiliary data display and data entry device is mated to the connectors of the smartphone using a tether or cable. In one embodiment, the tether includes a suitable connector on a first end for connecting to the smartphone, e.g., the proprietary connector for an iphone, and on a second end opposite the first end include one of more connectors including female connectors and male connections. For example, the second end can include two connectors, one for HDMI and another that is a replica of proprietary connector.

Exemplary embodiments in accordance with the present invention include an encrypted communication between the server and the auxiliary data display and data entry device. In one embodiment, the server includes a scrambler or encryption module and the auxiliary data display and data entry devices include a descrambler or decryption module. The descrambler on each data display and data entry device is synchronized with the scrambler on the server. Therefore the display on the data display and data entry is unscrambled but the data are transferred between the devices in a scrambled or encrypted state. In one embodiment, the descrambler is provided in the tether or cable that connects the data display and data entry device to the smartphone, and the scrambler/descrambler combination is implemented by generating a pseudorandom sequence that is synchronized between the server and the tether. In one embodiment, the pseudorandom number generator is seeded using some user-specific information, e.g., a fingerprint or a RSA key, that will be unknown and unavailable to any hacked display drivers in the smartphone. Systems and methods in accordance with the present invention provide the benefit of allowing an enterprise to equip a workforce with a cost effective auxiliary data display and data entry device, for example, arranged as a snap on cover, for the any personal cellphones or smartphone owned, purchased or used by member of the workforce, so that the members of the workforce can access their virtual office mobile phone images securely.

Exemplary embodiments in accordance with the present invention are also directed to a method for presenting and interacting with encrypted user-level (presentation) information destined to a personal computing device such as a smart phone. A secondary auxiliary data display and data entry device is linked to the personal computing device. Information and data to be send to the personal computing device across one or more data networks from one or more computing systems including servers in the data networks, is encrypted at the network computing systems. Data entry from the user of the personal computing device and data to be displayed on the personal computing device is diverted to the auxiliary data display and data entry device. The data that are to be displayed on the auxiliary data display and data entry device are decrypted following diversion to the auxiliary data display and data entry device. The data, including user a user interface environment are displayed to the end-user of the personal computing device. Similarly, the auxiliary data display and data entry device is used to obtain information or inputs from the end-user of the personal computing device. The obtained information is then encrypted before being provided to the personal computing device for transmission to the network-based computing system.

In one embodiment, the auxiliary data display and data entry device is wirelessly linked to the personal computing device. Alternatively, the auxiliary data display and data entry device is linked to the personal computing device using a cable or tether. Encrypting entered data and decrypting data to be displayed can be accomplished using the tether. Alternatively, encryption and decryption is embedded in the auxiliary data display and data entry device. The data to be displayed on the auxiliary data display and data entry device include video, images and text. The auxiliary data display and data entry device can include touch sensitive displays, a keyboard or a virtual keyboard.

Referring initially to FIG. 1, exemplary embodiments of the present invention are directed to a system 100 for secure virtualizing of a mobile cellular device. The system is configured as a communications network that includes both wired and wireless communications networking capabilities. Suitable wireless networking capabilities include any wireless communication hardware and protocols that allow network devices and mobile computing devices to communicate across the network including WiFi, Bluetooth and cellular network capabilities. Suitable mobile communication devices include, but are not limited to, laptop computers, tablet computers, cellular phones and smartphones, including android-based smartphone platforms and iPhones, which are commercially available from Apple Incorporated of Cupertino, Calif.

Preferably, the communication network is a cellular communication network. The cellular communication network includes a plurality of base transceiver stations 102, a plurality of base station controllers 104 and a mobile switching center 106. Each base station controller is in communication with and controls at least one of the plurality of base transceiver stations such that each one of the plurality of base transceiver stations are in communication with and controlled by a base station controller. The mobile switching center is in communication with each one of the plurality of base station controllers. The cellular communication network can include additional nodes and hardware devices as well as portions of the public switch telephone network (PSTN) and one or more private branch exchanges (PBX). Each base transceiver station is an edge node server within the cellular communication network.

The cellular communication network also includes a virtualized-instance host server running a virtualized instance of an enterprise environment 108 that includes at least one enterprise application. The virtualized-instance host server is any server or computing system that hosts the virtualized instance of the enterprise environment. The enterprise applications are applications provided to users in the virtualized instance that is running on the virtualized-instance host server, as opposed to running on local or remote computing devices or cellular communication devices. In one embodiment, the enterprise applications include applications associated with and available on the cellular communication device such as smartphone applications. In general, the virtualized instance of the enterprise environment is located on a virtualized-instance host server that is located deep within or at a high level within the cellular communication network. Therefore, the virtualized instance of the enterprise environment can be easily and readily communicated to all edge nodes within the cellular communication network. In one embodiment, the virtualized-instance host server is disposed in the mobile switching center and is in communication with each edge node server.

The system also includes at least one wireless or cellular communication device 110 that is in communication with the cellular communication network through one of the edge servers. In one embodiment, a given cellular communication device is attached to a given base station and is located within the range of communication of that given base station and the edge node server associated with that given base station, which is its current edge node server.

An auxiliary data display and data entry device 112 is provided in the system in communication with one of the cellular communication devices. Each data display and data entry device can be wirelessly connected to a cellular communication device, e.g., using Bluetooth communication protocols, or can be connected using a tether cable 114. In one embodiment, the auxiliary data display and data entry device is mounted on or over the cellular communication device, for example, using a form fitting arrangement that can snap-on or otherwise attach to the cellular communication device. In another embodiment, the auxiliary data display and data entry device can use the existing display and the existing data entry capabilities of the cellular communication device by connecting a secure key add-on 116 into a port of the cellular communication device. For example, the cellular communication device may include a high-definition multimedia interface (HDMI) port into which the secure key add-on is attached. In general, the auxiliary data display and data entry device is used to display the virtualized instance of the enterprise environment and to accept inputs, i.e., data inputs, from a user. The cellular communication device merely acts as a pass through device that provides communication connectivity between the auxiliary data display and data entry device and the virtualized-instance host server. Suitable auxiliary data display and data entry devices include, but are not limited to, touch sensitive panel displays.

The system of the present invention provides for movement of the attachment of a given cellular communication device between edge nodes in the cellular communication network and for secure, i.e., encrypted, communication between the auxiliary data display and data entry device and the virtualized-instance host server. The cellular communication device is attached to a current edge node server and is therefore within the range of communication associated with the base transceiver station associated with the current edge node server. In order to provide the virtualized instance of the enterprise environment to the auxiliary data display and data entry device, a remote virtualized instance of the enterprise environment is located on the current edge node server. The virtualized instance of the enterprise environment is displayed on the auxiliary data display and data entry device. A plurality of candidate future edge node servers exist within the system. These candidate future edge node servers have associated communication ranges into which the cellular communication device could travel from its current location. In order to prepare for the possibility of future attachment to these candidate future edge nodes, a plurality of additional remote virtualized instances of the enterprise environment are stored on the candidate future edge nodes. Each one of the additional remote virtualized instances is disposed on one of the plurality of candidate future edge servers.

In addition, an encryption and decryption system. i.e., a scrambler and descrambler, is disposed only on the virtualized-instance host server and the auxiliary data display and data entry device. Therefore, only encrypted communication passes between these elements, i.e., the encrypted information passes through the cellular communication device. In one embodiment, the encryption and decryption functionality of the auxiliary data display and data entry device is contained in the tether cable attaching the auxiliary data display and data entry device to the cellular communication device.

Figure 2:
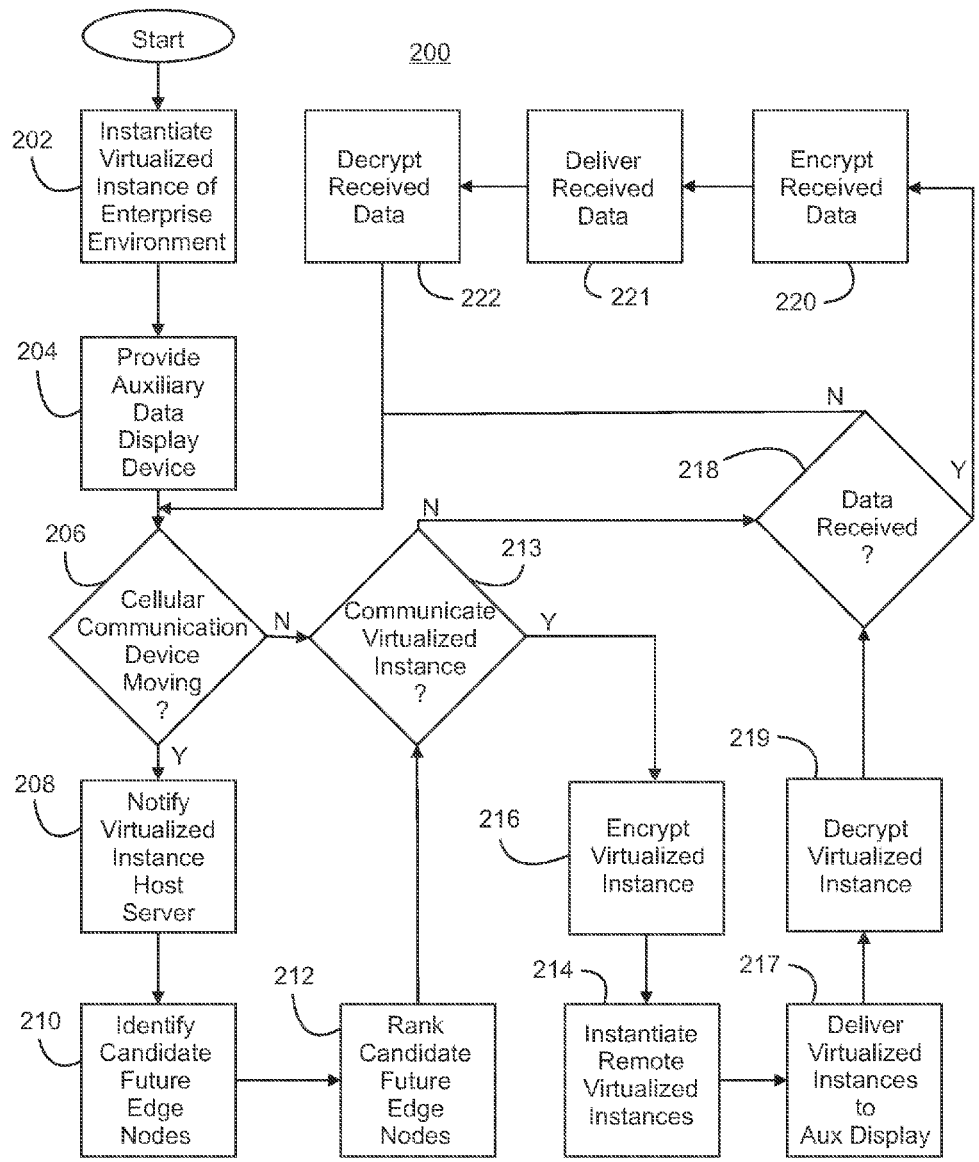
FIG. 2 is a flow chart illustrating an embodiment of a method for secure virtualizing of a mobile cellular device in accordance with the present invention.

Referring to FIG. 2, exemplary embodiments in accordance with the present invention are also directed to a method for secure virtualizing of a mobile cellular device 200. A virtualized instance of an enterprise environment having at least one enterprise application is instantiated on a virtualized-instance host server 202 disposed in a computing system. This computing system includes both wired and wireless networking. Suitable network computing systems include cellular communication networks with cellular communication networking. An auxiliary data display and data entry device is provided 204 at a wireless communication device that is in communication with the computing system through the wireless networking. Preferably, the wireless communication device is a cellular communication device such as a smartphone.

In one embodiment, the auxiliary data display and data entry device is a touch screen display. The auxiliary data display and data entry device is attached to the wireless communication device either wirelessly or with a wired connection such as a tether cable. In one embodiment, a secure plug-in is installed in the wireless communication device to utilize an existing display and existing data entry capabilities of the wireless communication device as the auxiliary data display and data entry device.

In one embodiment, the cellular communication network includes a plurality of base transceiver stations. Each base transceiver station represents an edge node server within the cellular communication network. The virtualized-instance host server is in communication with each edge node server, and the cellular communication device is in communication with a current edge node server. A remote virtualized instance of the enterprise environment is instantiated on the current edge node server. Therefore, the remote virtualized instance is delivered from the current edge node server to the auxiliary data display and data entry device through the cellular communication device. The cellular communication network also includes a plurality of base station controllers. Each based station controller is in communication with and controls at least one of the plurality of base transceiver stations. Therefore, each one of the plurality of base transceiver stations is in communication with and is controlled by a given base station controller. A mobile switching center is provided in communication with each one of the plurality of base station controllers. The virtualized-instance host server is disposed in the mobile switching center, i.e., deep within the cellular network so that it can communicate with all of the edge nodes and provide the virtualized instances to all of the edge nodes.

Since the cellular communication device is mobile and can change its point of attachment to the cellular communication network, a determination is made if the cellular communication device is moving 206. Pending movement of the cellular communication device can be predicted based on at least one of a history of movement patterns of the cellular communication device, a current location of the cellular communication device and signaling information received from adjacent edge nodes to the current edge nodes. If the cellular communication device is moving or likely to move, the virtualized-instance host server is notified 208 of the pending movement of the cellular communication device out of a communication range associated with the current edge node server, i.e., the edge node server to which it is currently attached. From the plurality of base stations, a plurality of candidate future edge node servers having associated communication ranges into which the cellular communication device could travel are identified. The plurality of candidate future edge node servers are ranked based on a likelihood of movement of the cellular communication device into the communication ranges associated with each one of the candidate future edge node servers 212.

If the virtualized instance of the enterprise environment is to be communicated to one or more edge servers 213, the virtualized instance of the enterprise environment is encrypted at the virtualized-instance host server 216. The remote virtualized instance of the enterprise environment are instantiated 214 on the current edge servers and each one of the plurality of candidate future edge servers. This encrypted virtualized instance of the enterprise environment is to the auxiliary data display and data entry device through the wireless communication device 217 from the edge node server to which it is currently attached. The encrypted virtualized instance of the enterprise environment is decrypted at the auxiliary data display and data entry device 219. Therefore, only encrypted data pass through the cellular communication device. The virtualized instance of the enterprise environment is displayed on the auxiliary data display and data entry device.

When data are entered using the auxiliary data display and data entry device 218, these data are encrypted at the auxiliary data display and data entry device 220. The encrypted data are delivered 221 to the virtualized-instance host server through the wireless communication device, and the encrypted data are decrypted 222 at the virtualized-instance host server. The entered data are processed using the enterprise application to process the data. When the auxiliary data display and data entry device is attached to the cellular communication device using a tether cable, the encrypted virtualized instance of the enterprise environment is decrypted at the tether cable.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for secure virtualizing of a mobile cellular device s in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for secure virtualizing of a mobile cellular device, the method comprising:
   instantiating a virtualized instance of an enterprise environment comprising at least one enterprise application on a virtualized-instance host server disposed in a cellular communication network comprising:
   a plurality of base transceiver stations, each base transceiver station comprising an edge node server within the cellular communication network;
   a plurality of base station controllers, each based station controller in communication with and controlling at least one of the plurality of base transceiver stations such that each one of the plurality of base transceiver stations are in communication with and controlled by a base station controller; and
   a mobile switching center in communication with each one of the plurality of base station controllers, the virtualized-instance host server disposed in the mobile switching center and in communication with each edge node server;
   providing an auxiliary data display and data entry device in combination with a cellular communication device, the auxiliary data display and data entry device separate from the cellular communication device and the cellular communication network, the cellular communication device in communication through the edge node servers to the cellular communication network and the auxiliary data display and data entry device in communication only through the cellular communication device to the cellular communication network;
   encrypting the virtualized instance of the enterprise environment at the virtualized-instance host server;
   delivering the encrypted virtualized instance of the enterprise environment to the auxiliary data display and data entry device by passing the encrypted virtualized instance of the enterprise environment from the cellular communication network through the cellular communication device to the auxiliary data display and data entry device;
decrypting the encrypted virtualized instance of the enterprise environment at the auxiliary data display and data entry device; and
displaying the virtualized instance of the enterprise environment only on the auxiliary data display and data entry device and using only the auxiliary data display and data entry device to enter data into the virtualized instance of the enterprise environment.

2. The method of claim 1, wherein the method further comprises:
entering data using the auxiliary data display and data entry device;
encrypting the data at the auxiliary data display and data entry device;
delivering the encrypted data to the virtualized-instance host server through the cellular communication device; and
decrypting the encrypted data at the virtualized-instance host server.

3. The method of claim 2, wherein the method further comprises using the enterprise application to process the data.

4. The method of claim 1, wherein the cellular communication device comprises a smartphone.

5. The method of claim 1, wherein:
the virtualized-instance host server is in communication with each edge node server and the cellular communication device is in communication with a current edge node server; and
the method further comprises:
instantiating a remote virtualized instance of the enterprise environment on the current edge node server; and
delivering the encrypted virtualized instance further comprises delivering the remote virtualized instance from the current edge node server to the auxiliary data display and data entry device through the cellular communication device.

6. The method of claim 5, wherein the method further comprises:
notifying the virtualized-instance host server of pending movement of the cellular communication device out of a communication range associated with the current edge node server;
identifying from the plurality of base stations a plurality of candidate future edge node servers having associated communication ranges into which the cellular communication device could travel; and
instantiating the remote virtualized instance of the enterprise environment on each one of the plurality of candidate future edge servers.

7. The method of claim 6, wherein the method further comprises predicting the pending movement of the cellular communication device based on at least one of a history of movement patterns of the cellular communication device, a current location of the cellular communication device and signaling information received from adjacent edge nodes to the current edge nodes.

8. The method of claim 6, further comprising ranking the plurality of candidate future edge node servers based on a likelihood of movement of the cellular communication device into the communication ranges associated with each one of the candidate future edge node servers.

9. The method of claim 1, wherein the auxiliary data display and data entry device comprises a touch screen display.

10. The method of claim 1, wherein:
providing the auxiliary data display and data entry device further comprises attaching the auxiliary data display and data entry device to the cellular communication device using a tether cable; and
decrypting the encrypted virtualized instance of the enterprise environment at the auxiliary data display and data entry device further comprising decrypting the encrypted virtualized instance of the enterprise environment at the tether cable.

11. The method of claim 1, wherein providing the auxiliary data display and data entry device further comprises installing a secure plug-in in the cellular communication device to utilize an existing display and existing data entry capabilities of the cellular communication device as the auxiliary data display and data entry device.

12. A system for secure virtualizing of a mobile cellular device, the system comprising:
a cellular communication network comprising:
a plurality of base transceiver stations, each base transceiver station comprising an edge node server within the cellular communication network;
a virtualized-instance host server comprising a virtualized instance of an enterprise environment comprising at least one enterprise application;
a plurality of base station controllers, each based station controller in communication with and controlling at least one of the plurality of base transceiver stations such that each one of the plurality of base transceiver stations are in communication with and controlled by a base station controller; and
a mobile switching center in communication with each one of the plurality of base station controllers, the virtualized-instance host server disposed in the mobile switching center and in communication with each edge node server;
a cellular communication device in communication with a current edge node server;
an auxiliary data display and data entry device separate from the cellular communication device and in communication with the current edge node server only through the cellular communication device, the cellular communication device functioning solely as a pass through device to provide communication between the auxiliary data display and data entry device and the current edge node server;
a remote virtualized instance of the enterprise environment on the current edge node server;
a display of the virtualized instance of the enterprise environment only on the auxiliary data display and data entry device;
a plurality of candidate future edge node servers having associated communication ranges into which the cellular communication device could travel;
a plurality of additional remote virtualized instances of the enterprise environment, each one of the additional remote virtualized instances disposed on one of the plurality of candidate future edge servers; and
an encryption and decryption system disposed only on the virtualized-instance host server and the auxiliary data display and data entry device to encrypt the virtualized instance of the enterprise environment at the virtualized-instance host server and to decrypting the encrypted virtualized instance of the enterprise environment at the auxiliary data display and data entry device.

13. A non-transitory computer-readable storage medium containing a computer-readable code that when read by a computer causes the computer to perform a method for secure virtualizing of a mobile cellular device, the method comprising:
instantiating a virtualized instance of an enterprise environment comprising at least one enterprise application on a virtualized-instance host server disposed in a cellular communication network comprising:
a plurality of base transceiver stations, each base transceiver station comprising an edge node server within the cellular communication network;
a plurality of base station controllers, each based station controller in communication with and controlling at least one of the plurality of base transceiver stations such that each one of the plurality of base transceiver stations are in communication with and controlled by a base station controller; and
a mobile switching center in communication with each one of the plurality of base station controllers, the virtualized-instance host server disposed in the mobile switching center and in communication with each edge node server;
providing an auxiliary data display and data entry device in combination with a cellular communication device, the auxiliary data display and data entry device separate from the cellular communication device and the cellular communication network, the cellular communication device in communication through the edge node servers to the cellular communication network and the auxiliary data display and data entry device in communication only through the cellular communication device to the cellular communication network;
encrypting the virtualized instance of the enterprise environment at the virtualized-instance host server;
delivering the encrypted virtualized instance of the enterprise environment to the auxiliary data display and data entry device by passing the encrypted virtualized instance of the enterprise environment from the cellular communication network through the cellular communication device to the auxiliary data display and data entry device;
decrypting the encrypted virtualized instance of the enterprise environment at the auxiliary data display and data entry device; and
displaying the virtualized instance of the enterprise environment only on the auxiliary data display and data entry device and using only the auxiliary data display and data entry device to enter data into the virtualized instance of the enterprise environment.

14. The non-transitory computer-readable storage medium of claim 13, wherein the method further comprises:
entering data using the auxiliary data display and data entry device;
encrypting the data at the auxiliary data display and data entry device;
delivering the encrypted data to the virtualized-instance host server through the cellular communication device; and
decrypting the encrypted data at the virtualized-instance host server.

15. The non-transitory computer-readable storage medium of claim 13, wherein:
the virtualized-instance host server is in communication with each edge node server; and
the cellular communication device is in communication with a current edge node server; and
the method further comprises:
instantiating a remote virtualized instance of the enterprise environment on the current edge node server; and
delivering the encrypted virtualized instance further comprises delivering the remote virtualized instance from the current edge node server to the auxiliary data display and data entry device through the cellular communication device.

16. The non-transitory computer-readable storage medium of claim 15, wherein the method further comprises:
notifying the virtualized-instance host server of pending movement of the cellular communication device out of a communication range associated with the current edge node server;
identifying from the plurality of base stations a plurality of candidate future edge node servers having associated communication ranges into which the cellular communication device could travel; and
instantiating the remote virtualized instance of the enterprise environment on each one of the plurality of candidate future edge servers.

17. The non-transitory computer-readable storage medium of claim 16, wherein the method further comprises predicting the pending movement of the cellular communication device based on at least one of a history of movement patterns of the cellular communication device, a current location of the cellular communication device and signaling information received from adjacent edge nodes to the current edge nodes.

18. The non-transitory computer-readable storage medium of claim 16, wherein the method further comprises ranking the plurality of candidate future edge node servers based on a likelihood of movement of the cellular communication device into the communication ranges associated with each one of the candidate future edge node servers.

19. The non-transitory computer-readable storage medium of claim 13, wherein:
providing the auxiliary data display and data entry device further comprises attaching the auxiliary data display and data entry device to the cellular communication device using a tether cable; and
decrypting the encrypted virtualized instance of the enterprise environment at the auxiliary data display and data entry device further comprising decrypting the encrypted virtualized instance of the enterprise environment at the tether cable.

20. The non-transitory computer-readable storage medium of claim 13, wherein providing the auxiliary data display and data entry device further comprises installing a secure plug-in in the cellular communication device to utilize an existing display and existing data entry capabilities of the cellular communication device as the auxiliary data display and data entry device.

* * * * *